United States Patent [19]
Miller

[11] 4,266,506
[45] May 12, 1981

[54] APPARATUS FOR PRODUCING CRYOGENIC INERTIALLY DRIVEN FUSION TARGETS

[75] Inventor: John R. Miller, Los Alamos, N. Mex.

[73] Assignee: The United States of America as represented by the United States Department of Energy, Washington, D.C.

[21] Appl. No.: 872,284

[22] Filed: Jan. 25, 1978

[51] Int. Cl.³ .......................... B05D 7/00; G21C 3/20
[52] U.S. Cl. .................................... 118/725; 118/726; 176/91 SP; 427/6
[58] Field of Search ...................... 427/6, 237, 53, 105, 427/107; 176/1, 91 SP; 118/49.1, 49.5, 724, 725, 726, 715, 716

[56] References Cited

U.S. PATENT DOCUMENTS 3,953,617  4/1976  Smith et al. .............................. 427/6

FOREIGN PATENT DOCUMENTS 2548445  5/1976  Fed. Rep. of Germany .............. 427/6
2548446  5/1976  Fed. Rep. of Germany .............. 427/6

OTHER PUBLICATIONS

Miller, J. R., *A New Method for Producing Cryogenic Laser-Fusion Targets*—submitted to the 18th Annual Meeting of the Plasma Physics Division of the American Physical Society [Nov. 15-19, 1976] San Francisco, CA-14 pages.

*Nuclear Fusion*, "The Calculated Performance of Structured Laser Fusion Pellets," Mason, vol. 15, No. 6, pp. 1031-1041.

*Primary Examiner*—Morris Kaplan
*Attorney, Agent, or Firm*—R. V. Lupo; Paul D. Gaetjens; William W. Cochran, III

[57] ABSTRACT

A new technique for producing uniform layers of solid DT on microballoon surfaces. Local heating of the target, typically by means of a focused laser, within an isothermal freezing cell containing a low pressure cryogenic exchange gas such as helium, vaporizes the DT fuel contained within the microballoon. Removal of the laser heating source causes the DT gas to rapidly condense and freeze in a layer which exhibits a good degree of uniformity.

10 Claims, 6 Drawing Figures

APPARATUS FOR PRODUCING CRYOGENIC INERTIALLY DRIVEN FUSION TARGETS

BACKGROUND OF THE INVENTION

The present invention pertains generally to cryogenics and more particularly to inertially driven fusion (laser, electron beam, ion beam, etc.) target fabrication.

A number of techniques, offering varying degrees of success, have been used to produce cryogenic fuel cores within glass microballoon spheres. The difficulties associated with forming a uniform liquid or solid layer of material such as DT, arises from the smallness of the fuel core, the effects of gravity, and the strong influence played by surface rather than by bulk properties of DT. Typically, the condensed fuel layer thickness in a 100-$\mu$-diameter sphere filled with 10 ng of DT is approximately 1 $\mu$m.

Classical calculations to determine the surface shape of liquid DT held in a constant temperature spherical container in a gravitational field, and the time required for this equilibrium liquid distribution to be reached, were originally performed by Lawrence J. Campbell of the Los Alamos Scientific Laboratory in January of 1974. It was found that by minimizing the free energy, i.e., gravitational and surface energy, and using the appropriate wetting angle of the liquid, the liquid thickness monatomically increases from zero at the sphere top to a value much larger than average at the bottom, as graphically shown in FIG. 1. Campbell found the liquid sag time to be $\tau = 3Dz/\rho gt^2$, where D is the sphere diameter, g is the gravitational constant, and $\rho$, z, and t are respectively the liquid density, viscosity, and initial thickness. For a uniform 1-$\mu$m-thick DT liquid film at 21° K. covering the inner surface of a 100-$\mu$m-diameter sphere, the sag time ($\tau$) has been approximated at 4 s. The numerous difficulties encountered by experimentalists in producing desired cryogenic fuel cores, is evidenced by their numerous unsuccessful attempts at producing a successful target.

An early cryogenic target-producing technique pursued by T. M. Henderson, R. B. Jacobs, D. E. Solomon, G. H. Wuttke, at KMS Fusion, Inc. involved rapidly engulfing a fuel core in a droplet of liquid hydrogen. According to this technique, liquid or solid DT was produced in the fuel core, depending on the temperature of the hydrogen droplet refrigerant. This technique, however, produced grossly nonuniform deposits of DT which were clearly unsuitable for fusion target cores.

Another technique, conduction cooling through the fuel core support, has been experimentally studied as disclosed in "Laser Program at LASL, Jan. 1–June 30, 1975," Los Alamos Scientific Laboratory Progress Report LA-6050-PR (January 1976) pp. 80–81, and by T. M. Henderson, R. B. Jacobs, G. H. Wuttke, and D. E. Solomon in Advances in Cryogenic Engineering, Vol. 21 (1975). In accordance with that technique, the fuel core is glued to a cooled, thin metal fiber which provides refrigeration. With a metal fiber of suitable size, the DT's heat of vaporization and fusion, the heat radiation which has been absorbed and the heat generation due to the tritium $\beta$-decay can be removed. DT fuel condenses in the glass microballoon near the support attachment and flows away from the attachment point until the condensed DT fuel reaches a location where the temperature is sufficiently high to cause evaporation. The evaporated DT recondenses at the coldest location and the cycle is repeated until a liquid layer is produced. With the proper fiber diameter, length, the correct amount of fastening glue, the right temperature and other conditions, a relatively uniform layer of liquid DT can be produced by this method of conduction cooling.

However, the layers so produced are transient. The experimental difficulty of first establishing and then maintaining the proper temperature profile across the fuel core hinders formation of a long-lived uniform liquid layer. A second disadvantage of the conduction cooling method, and of all methods that produce liquid, rather than solid fuel cryogenic fusion targets, is that a fraction of the fuel remains in a gaseous state. To minimize the amount of fuel in the gaseous state, the entire fuel core must be at a temperature proximate the fuel's triple point temperature. However, since all of the fuel rapidly freezes at locations where the fuel core is below the triple point, and since a large portion of the fuel core is above DT's evaporation temperature, the average temperature of the fuel core is many degrees higher than the fuel's triple point resulting in an appreciable fraction of the fuel remaining in a gaseous state. A third disadvantage of the conduction cooling method relates to the metal fiber support. To provide the necessary refrigeration for a 100-$\mu$m-diameter glass microballoon, a wire diameter of approximately 15 $\mu$m is needed. This support not only disturbs the desired spherical symmetry of the fuel core, but also adds considerable nonfuel mass which reduces the heating efficiency of the imploding laser beam, electron beam, or ion beam. A fourth disadvantage of the conduction cooling method results from the fractional distillation occurring within the fuel core. Since each molecular species of the DT fuel ($T_2$, $D_2$ or DT) has a different triple point and vapor pressure, and since the temperature difference from the support fiber to the opposite side is large, the fuel species will not be well mixed in the liquid layer.

Another technique pursued at Los Alamos by Stephen Sydoriak, utilizes heat removal through an exchange gas surrounding the fuel core in which the fuel core is attached with a thin glass fiber and slowly spun in quasi-isothermal conditions maintained by a helium heat exchange gas. Although complete liquid coverage of the interior fuel core surface is achieved, uniform layers of frozen DT are not formed as the temperature is decreased.

A passive method has also been pursued at Los Alamos as disclosed in "Laser Program at LASL, July 1–Dec. 31, 1975," Los Alamos Scientific Laboratory Report LA-6245-PR, p. 82, wherein solid DT layers in fuel cores have been tested. The concept of this technique comprises use of heat released by radioactive decay of the tritium fuel to assist in spreading an initially nonuniform solid layer. With the fuel core in a uniform temperature environment just below the triple-point of DT, the additional $\beta$-decay heat in thick layer areas was expected to induce sublimation and subsequent recondensation in cooler, thin-layer areas. This procedure, however, was not found to be successful for reasons not well understood.

Another attempt to produce liquid-layer cryogenic fuel cores is disclosed by E. R. Grilly, "Condensation of Hydrogen Isotopes in Laser Fusion Targets," Rev. Sci. Instrum. 48, no. 2, 1977, pp. 39–42, wherein heat extraction is accomplished by a direct jet of gaseous helium at 4° K. In this cooling configuration, the effects of gravitationally driven liquid sag can be counteracted by imposing a temperature gradient on the fuel core. As with the conduction cooling technique, the jet method produces incomplete condensation of the fuel, as well as unstable and short-lived cryogenic fuel cores.

As is apparent, solid-fuel cryogenic fuel cores have a distinct advantage over the liquid fuel cores, in that solid fuel cores have a virtually unlimited lifetime and are very stable, provided the solid cores are kept well below the melting temperature of the core material. However, prior art devices and methods have been unable to produce uniform, solid, fuel core layers on target surfaces.

SUMMARY OF THE INVENTION

The present invention overcomes the disadvantages and limitations of the prior art by providing a device for fast isothermal freezing to produce a uniform solid layer of cryogenic material on a target surface. According to the present invention, uniform layers of a low z cryogenic material such as DT, are formed by condensing and rapidly freezing the core material in an isothermal cryogenic atmosphere. Since the fuel core is cooled quickly and uniformly, the fuel condenses into a constant thickness liquid film. Before gravity causes the liquid to sag, the fuel core is further cooled in a uniform manner to freeze the liquid to produce a solid layer fuel core of nearly constant thickness.

It is therefore an object of the present invention to provide a device for fast isothermal freezing.

It is also an object of the present invention to provide a device for fast isothermal freezing which forms uniform fuel core layers.

Another object of the present invention is to provide a device for fast isothermal freezing which is simple and easy to implement.

Another object of the present invention is to provide a device for a fast isothermal freezing which produces uniform and symmetric fuel cores having an extended lifetime.

Other objects and further scope of applicability of the present invention will become apparent from the detailed description given hereinafter. The detailed description, indicating the preferred embodiment of the invention, is given only by way of illustration since the various changes and modifications within the spirit and scope of the invention will become apparent to those skilled in the art from the detailed description. The foregoing Abstract of the Disclosure is for the purpose of providing a nonlegal brief statement to serve as a searching and scanning tool for scientists, engineers and researchers and is not intended to limit the scope of the invention as disclosed herein nor is it intended to be used in interpreting or in any way limiting the scope or fair meaning of the appended claims.

DETAILED DESCRIPTION OF THE PREFERRED EMBODIMENT OF THE INVENTION

Figure 2:
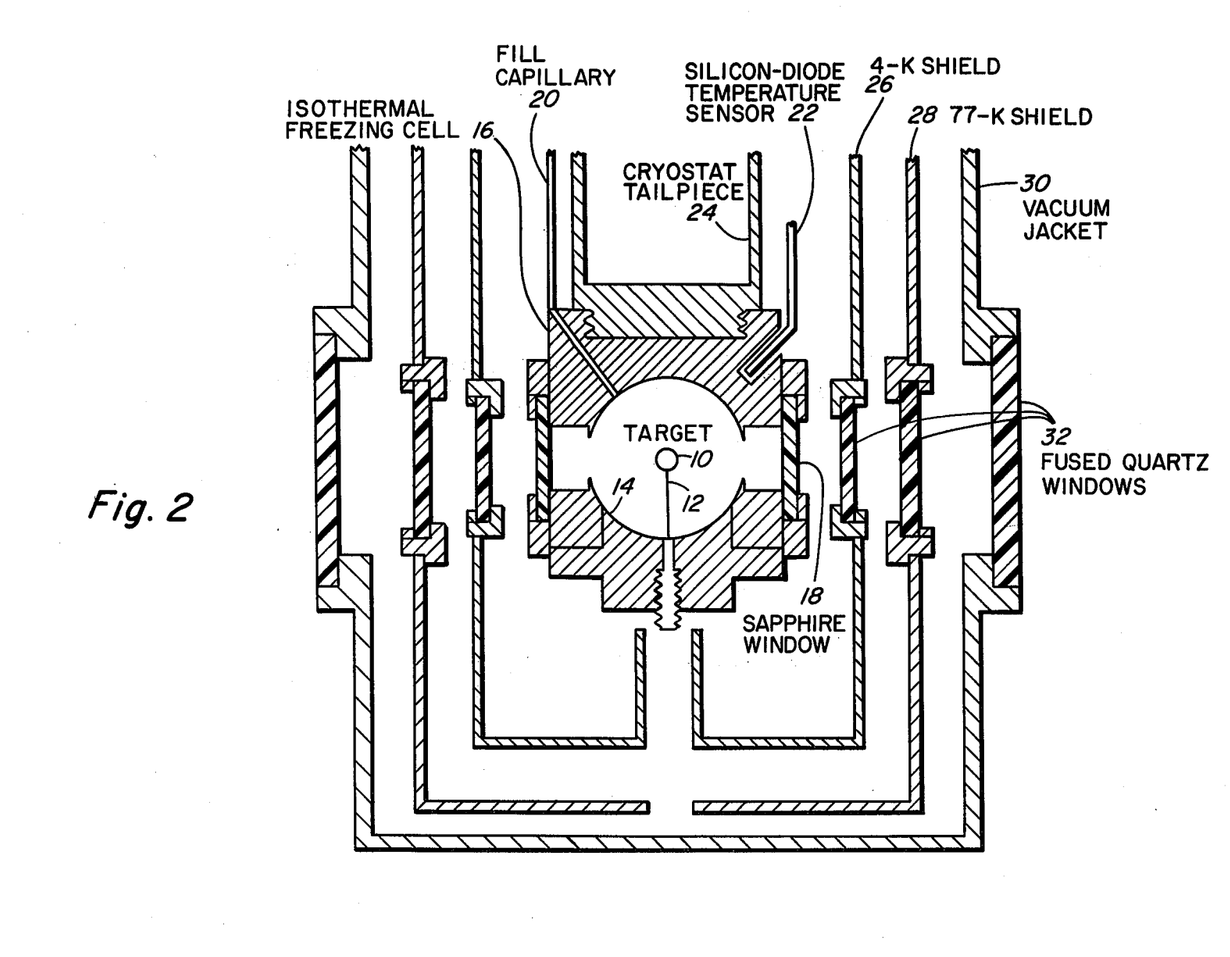
FIG. 2 is a schematic illustration of an isothermal freezing cell used in the preferred embodiment of the invention.

Referring to FIG. 2, the target 10, which typically comprises a glass microballoon, is supported on a thin glass stock 12 in the center of an isothermal freezing cavity 14 within an isothermal freezing cell 16. The target 10 is thermally coupled to the isothermal freezing cell 16 by way of a low pressure cryogenic helium gas maintained within the cavity 14, typically at a pressure of approximately 160 mtorr or greater.

The isothermal freezing cell 16, as shown in FIG. 2, is designed to provide an extremely homogeneous temperature environment surrounding the target 10. The cell 16 is machined from a block of oxygen-free hard copper and contains four indium-attached single-crystal sapphire windows 18. The sapphire windows 18 are made large and have high-conductivity to allow introduction of both laser heating and illumination for continuous observation of the freezing process on two orthogonal axes, while preserving the isothermal environment within the cavity 14. The inner surface of the cavity 14 is black-oxidized to increase both radiation emissivity and the exchange gas accommodation coefficient. Fill capillary 20 provides a means for introducing the cryogenic helium exchange gas to the cavity 14. A silicon-diode temperature sensor 22 is anchored to the cell interior to monitor the temperature of the isothermal freezing cell 16. The cell 16 is attached to the tailpiece of a commercial cryostat 24 and is surrounded by concentric cylindrical radiation shields 26 and 28 and a vacuum jacket 30, each of which has four fused quartz windows formed therein. The entire assembly provides f/2 optical access to the target on two orthogonal axes.

Figure 3:
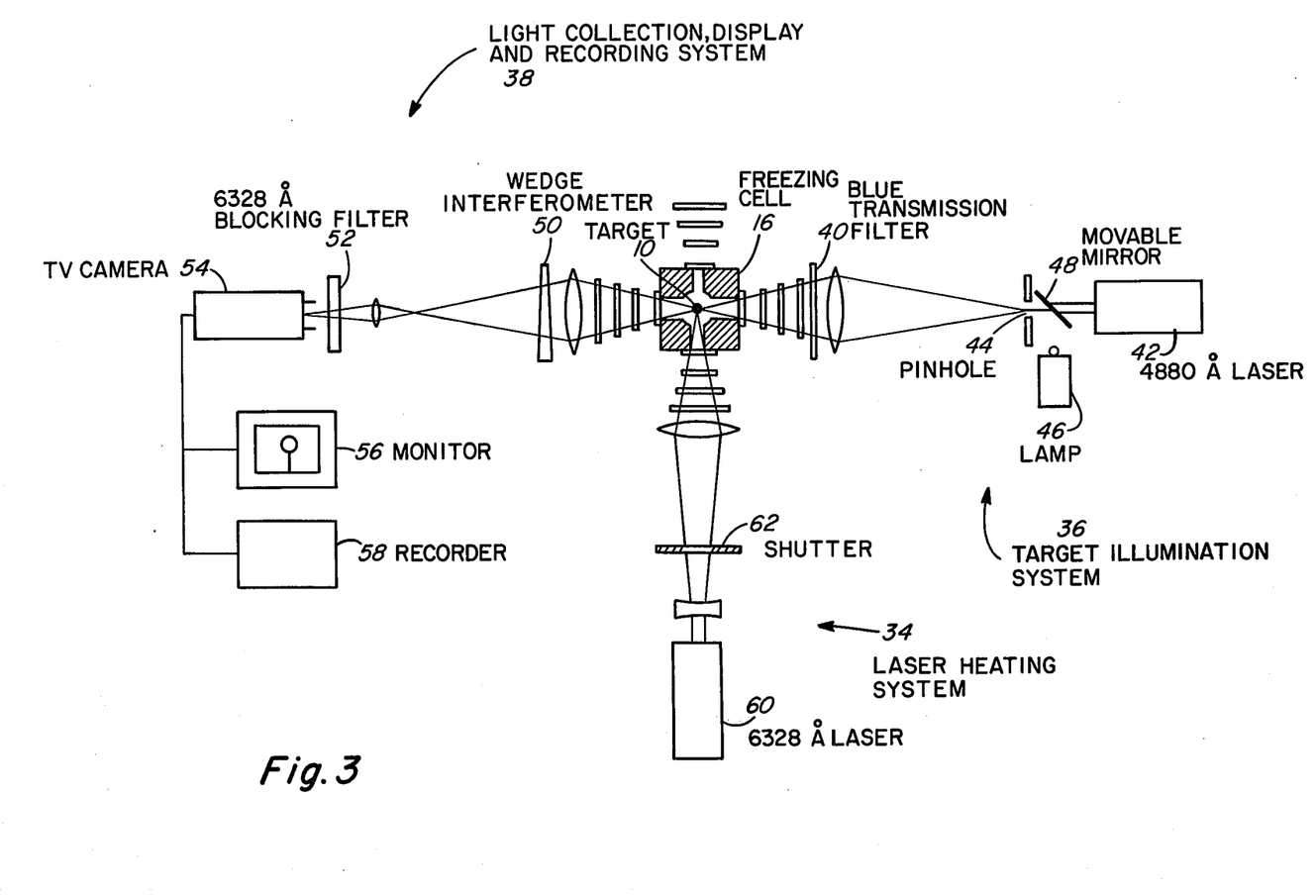
FIG. 3 is an experimental setup illustrating the preferred embodiment of the invention.

The experimental layout, schematically shown in FIG. 3, consists of the isothermal freezing cell 16, a laser heating system 34, a target illumination system 36, and a light-collection, display, and recording system 38. The target is illuminated by either white light filtered by a blue transmission filter 40 or, for interferometric observation, by 4880-Å laser 42. A lighted pinhole 44 is imaged to the target plane from light emitted by either 4880 Å laser 42 or lamp 46 via moveable mirror 48. The illuminated area is a few times the diameter of the target at the center of the isothermal cavity 14. Light from the illuminated target is collected by an f/2 optical system, and passed through interferometer 50 and 6328-Å blocking filter 52, to attenuate heating laser light, and then imaged onto a high resolution silicon-diode matrix vidicon camera 54. The high sensitivity of the vidicon of TV camera 54 allows for a very low illumination intensity, i.e., less than 50 nw on the target, which minimizes perturbation of the target's isothermal environment. The image of the target is displayed on monitor 56 and recorded on recorder 58.

For melting and vaporizing the DT fuel contained within the glass microballoon target 10, light from a helium neon 6328-Å heating laser 60 is focused to approximately the target diameter with a Galilean optical system and introduced perpendicular to the viewing axis. Alignment is facilitated by observing the projected diffraction pattern from the target. The required power of the heating laser 60 is dictated by the heat exchange gas pressure in the isothermal cell 16 surrounding the target 10. A 2 mw laser can completely vaporize the fuel, provided the cell pressure is 55 mtorr or less. At 55 mtorr, 10 ng of DT held in a 100-μm-diameter glass microballoon is completely vaporized when the laser 60 is on, and condenses and freezes in approximately 0.3 s after the laser is shuttered via shutter 62.

In operation, the target is first heated by a laser 60 to melt and vaporize all of the fuel contained within the glass microballoon target 10. Local target heating is then removed by shuttering the laser beam from laser 60 by means of shutter 62, whereupon a very high cooling power provided by the helium heat exchange gas causes the fuel to condense and freeze in a fraction of a second into a uniform layer on the inside surface of the glass microballoon. Since the target is in an extremely isothermal environment, and since solid formation is much more rapid than gravitationally driven motion of the liquid DT, condensation and solidification occur uniformly over the inner surface of the glass microballoon target 10 to provide a solid DT layer of constant thickness. Since the vapor pressure of 4 K. DT is low, i.e., less than $10^{-12}$ torr, the uniformity of the solid layer persists for an extended period.

Figure 1:
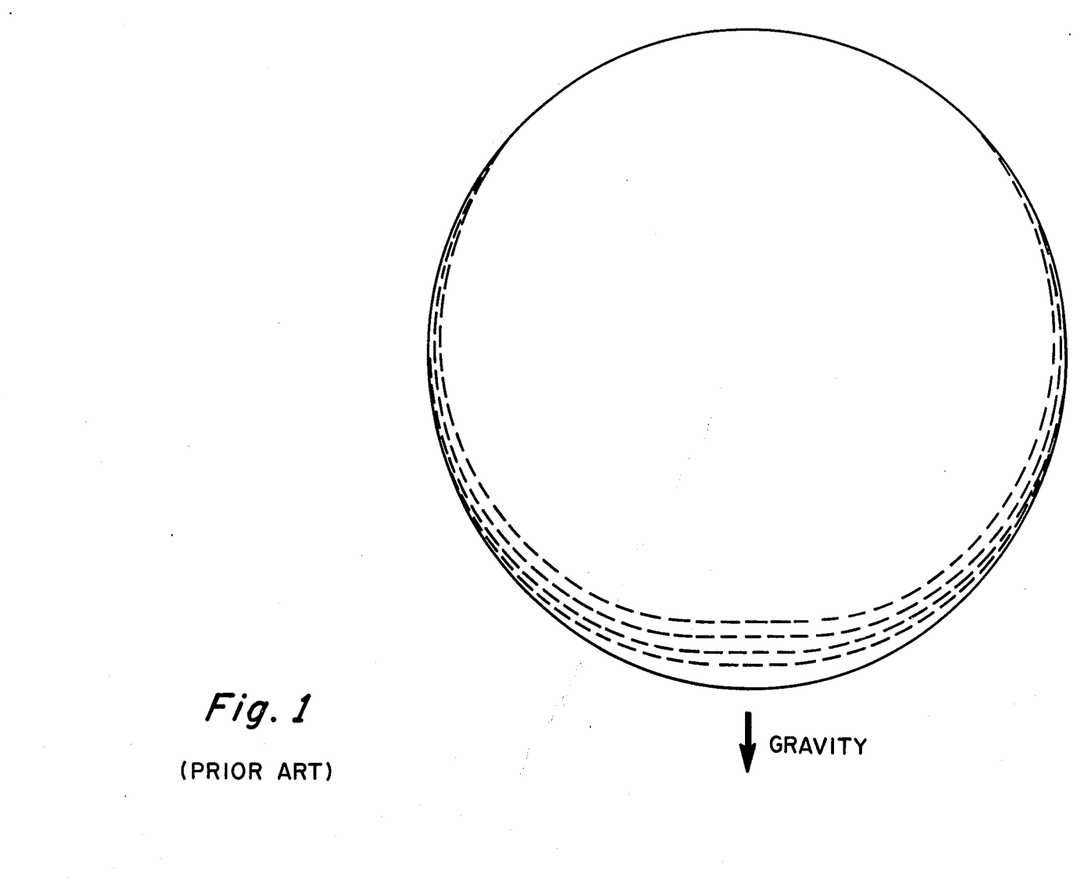
FIG. 1 is a prior art drawing illustrating the effect of gravity on a liquid filled core.
Figure 4:
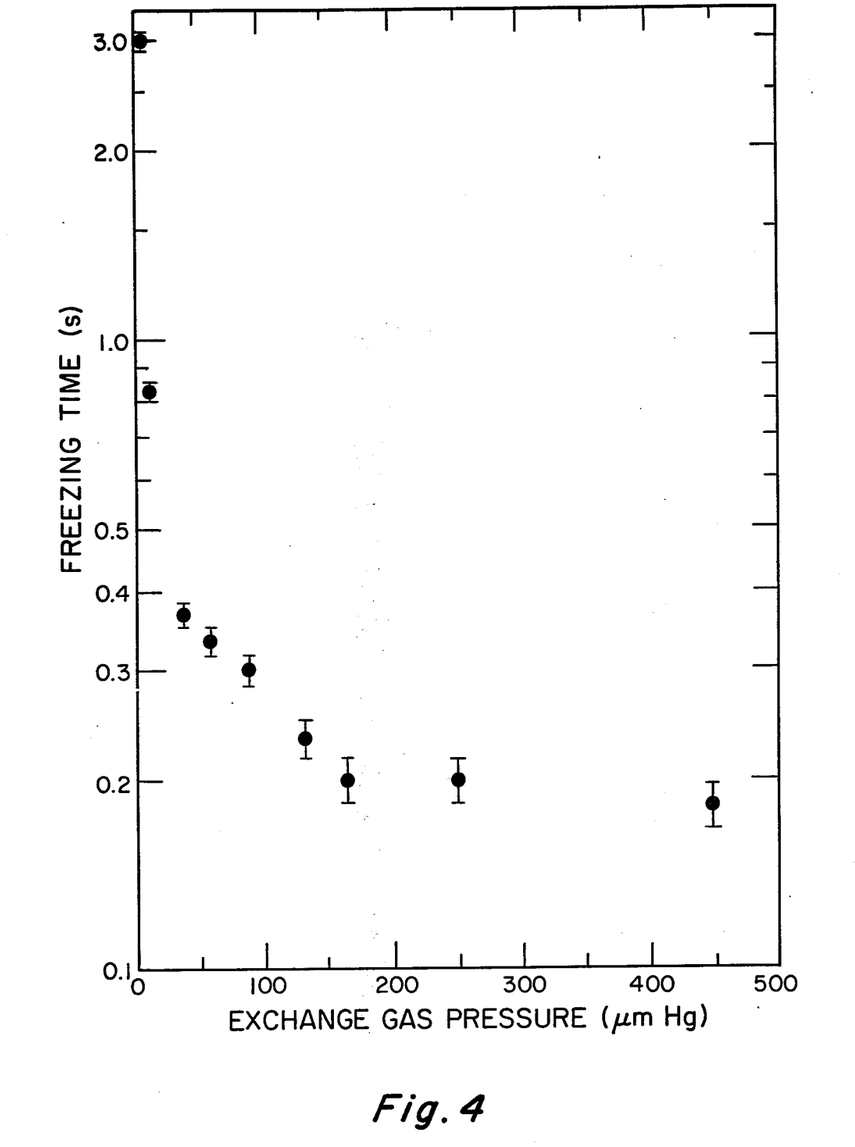
FIG. 4 is a graph of the exchange gas pressure versus freezing time according to the process of the preferred embodiment of the invention.

FIG. 4 illustrates the condensation freezing time as a function of the exchange gas pressure within the isothermal freezing cell 16 using a 15 mw heating laser. According to the graph of FIG. 4, as the gas pressure is increased, the freezing time decreases to approximately 0.2 s, at pressures above 160 mtorr. The best uniformity of the solid DT layer fuel core is obtained by using the most rapid condensation and freezing rates, i.e., those that take place at an exchange gas pressure of at least 160 mtorr. At lower exchange gas pressures, the condensation freezing time is sufficiently long to allow considerable liquid sag, resulting in a nonuniform solid layer such as illustrated in FIG. 1. The isothermal environment of the freezing cell 16 is negligibly disrupted by the heating laser since the laser is focused and applied locally to the target.

Measurement techniques of fuel layer uniformity have included direct visual observation, Reedy-refraction and interferometric observation.

Figure 5:
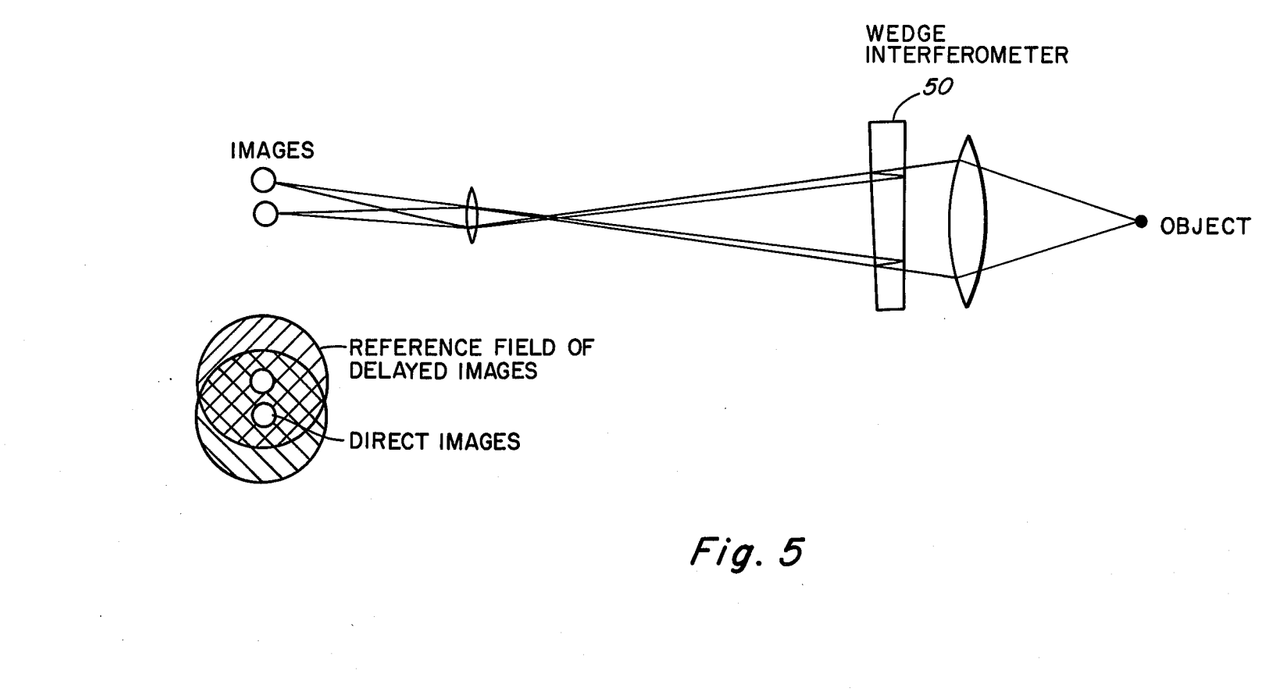
FIG. 5 is a schematic illustration of the optical arrangement for determining uniformity of fuel core layers produced according to the preferred embodiment of the invention.

Interferograms of cryogenic fuel cores have been obtained by inserting a wedge interferometer into the light collection system as shown in FIG. 5. This type of interferometer is easy to set up, can be used at a large working distance from the target, and is not susceptible to vibration or air currents. In operation, light that is directly transmitted through the wedge interfers with the reference field of the twice-reflected light at the image plane of the collection system, producing the desired fuel core interferogram. The wedge interferometer 50 is oriented so as to produce a background around the target image which has a constant phase, i.e., no fringe pattern.

Figure 6:
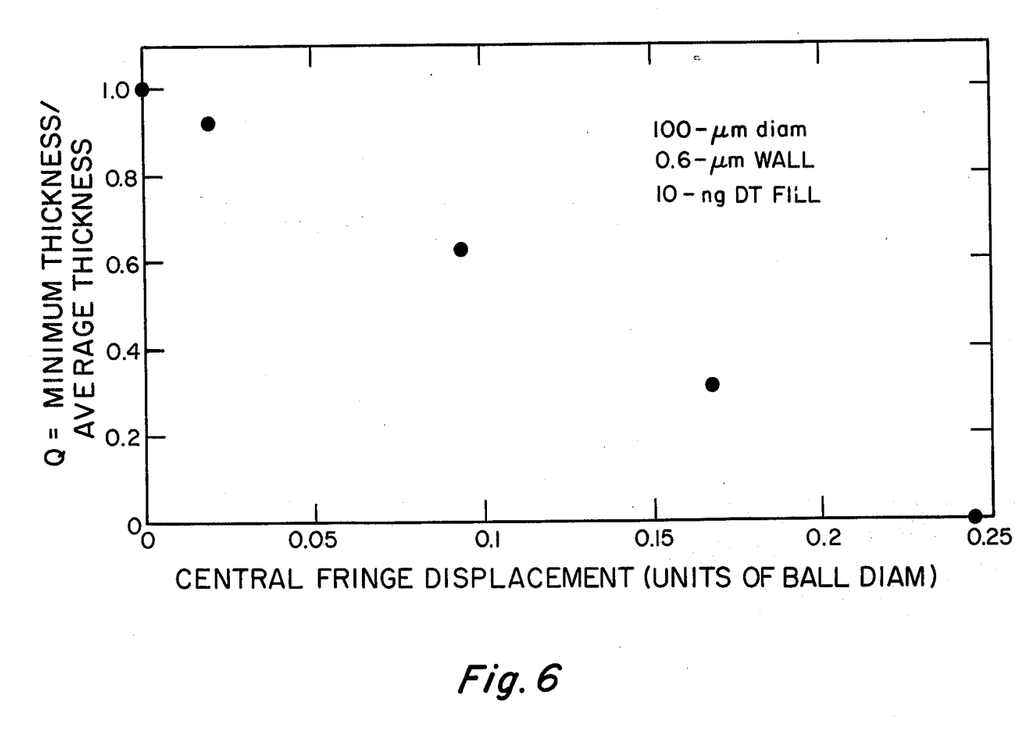
FIG. 6 is a graph of the central interference fringe displacement versus the parameter Q, illustrating the manner of measuring uniformity of fuel core layers produced according to the preferred embodiment of the invention.

By comparing the experimental interferograms of a cryogenic target produced by the fast isothermal freezing techniques of the preferred embodiment, with the results shown in FIG. 6, the DT fuel core layer's uniformity can be quantitatively determined. A DT fuel core layer having a uniformity of at least Q=0.9 in the measured plane perpendicular to the viewing axis is reproducibly and consistently made when the exchange gas pressure is $\geq$ to 55 mtorr. The thickness uniformity of the frozen DT layer does not depend critically on the alignment of the heating laser, provided that all of the DT fuel is vaporized. In this manner, uniform solid DT layers are obtained reproducibly through an arbitrary number of melting/vaporization—condensation/freezing cycles.

The present invention therefore provides a device for reproducibly obtaining uniform layers of solid DT in glass microballoons in a manner which is simple and easy to implement. The frozen layers of fuel produced in this manner have great stability, longevity, and uniformity, while maintained in a cryogenic environment.

Obviously many modifications and variations of the present invention are possible in light of the above teachings. It is therefore to be understood that within the scope of the appended claims, the invention may be practiced otherwise than as specifically disclosed herein.

What is claimed is:

1. A device for forming a substantially uniform layer of a cryogenic material on the inner surface of a microballoon sphere comprising:
   an isothermal freezing cell containing said microballoon;
   cryogenic He contained within said isothermal freezing cell at approximately 4° K. at a pressure sufficient to rapidly freeze said cryogenic material in a uniform layer;
   means for locally heating said microballoon sphere to vaporize said cryogenic material within said microballoon sphere;
   means for rapidly eliminating said means for local heating to cause said cryogenic material to condense and freeze at a rate sufficient to form a substantially uniform layer on said inner surface of said microballoon sphere.

2. The device of claim 1 wherein said isothermal freezing cell comprises an insulated cavity having high heat conductivity windows formed therein.

3. The device of claim 1 wherein said means for locally heating comprises a laser beam.

4. The device of claim 1 further comprising;
   means for illuminating said microballoon sphere with low intensity light;
   means for detecting and displaying said microballoon sphere.

5. The device of claim 1 wherein said means for detecting and displaying includes wedge interferometer means for obtaining interferometric images of said substantially uniform layer to evaluate its uniformity.

6. A device for producing a substantially uniform layer of low z material on the surface of a microballoon comprising:
   an isothermal freezing cavity containing a low pressure and low temperature exchange gas to maintain said cavity at a temperature sufficient to freeze said low z material at a rate which is much greater than the liquid sag rate of said low z material;
   a microballoon containing said low z material disposed in said cavity;
   means for heating a localized area within said isothermal freezing cavity containing said microballoon to vaporize said low z material;
   means for rapidly excluding said means for heating from said localized area such that vaporized low z material within said microballoon condenses and freezes on said surface of said microballoon in a substantially uniform layer.

7. The device of claim 6 wherein said means for heating comprises a laser beam.

8. The device of claim 6 wherein said low pressure and low temperature exchange gas comprises He at approximately 4° K. and approximately 160 mtorr.

9. The device of claim 6 wherein said low z material comprises DT.

10. The device of claim 6 wherein said low z material comprises DD.

* * * * *